United States Patent [19]

Copeland, III

[11] 3,774,182

[45] Nov. 20, 1973

[54] CONDUCTOR-PATTERN APPARATUS FOR CONTROLLABLY INVERTING THE SEQUENCE OF A SERIAL PATTERN OF SINGLE-WALL MAGNETIC DOMAINS

[75] Inventor: John Alexander Copeland, III, Gillette, N.J.

[73] Assignee: Bell Telephone Laboratories Incorporated, Murray Hill, N.J.

[22] Filed: Aug. 15, 1972

[21] Appl. No.: 280,785

[52] U.S. Cl. 340/174 VA, 340/174 TF, 340/174 SR

[51] Int. Cl. ........................ G11c 19/00, G11c 11/14

[58] Field of Search ................ 340/174 TF, 174 SR, 340/174 VA

[56] References Cited

UNITED STATES PATENTS

| | | | |
|---|---|---|---|
| 3,518,643 | 6/1970 | Perneski | 340/174 TF |
| 3,534,346 | 10/1970 | Bobeck | 340/174 TF |
| 3,553,661 | 1/1971 | Hadden, Jr. | 340/174 TF |
| 3,636,531 | 1/1972 | Copeland | 340/174 TF |
| 3,693,177 | 9/1972 | Owens | 340/174 TF |
| 3,711,840 | 1/1973 | Copeland | 340/174 TF |

*Primary Examiner*—Stanley M. Urynowicz, Jr.
*Attorney*—W. L. Keefauver

[57] ABSTRACT

A circuit for controllably inverting the sequence of a serial pattern of single-wall magnetic domains is implemented by offsetting or "phasing" opposing serrations on the sides of a serrated groove which is superimposed by a serpentine conductor pattern that defines a serial string of enhanced propagation-pulse write circuits on both sides of the groove. A propagating pattern of domains on one side of the groove is displaced to the opposite side of the groove in response to an enhanced propagation pulse, thereby reversing the direction and inverting the sequence of domain propagation.

6 Claims, 3 Drawing Figures

CONDUCTOR-PATTERN APPARATUS FOR CONTROLLABLY INVERTING THE SEQUENCE OF A SERIAL PATTERN OF SINGLE-WALL MAGNETIC DOMAINS

BACKGROUND OF THE INVENTION

1. Field of the Invention

This invention relates to single-wall magnetic domain technology and, more particularly, to an apparatus for inverting the sequence of a serial string of single-wall magnetic domains.

2. Prior Art

Two somewhat diversified approaches have developed in the art of single-wall magnetic domain technology for controllably propagating domains in a layer of magnetic material. One approach has led to the development of "field-accessed" apparatus in which domains are moved about in a layer of material in response to a common magnetic field which continually reorients itself in the plane of the layer. The other approach has resulted in the development of "conductor pattern" apparatus for realizing domain movement through a number of localized magnetic field gradients. These field gradients are generally produced by applying sequences of pulses to conductor-pattern arrays which are consecutively offset from the positions occupied by the domains. In the early stages of development, conductor-pattern arrays usually comprised serially interconnected sets of conductor loops spaced in a manner to provide three-phase shift register operation. An example of this technique is shown and described in U. S. Pat. No. 3,460,116, issued Aug. 5, 1969 to A. H. Bobeck, U. F. Gianola, R. C. Sherwood, and W. Shockley.

The three-phase mode of domain propagation is limited, however, by the maximum density of conductors which can be deposited per unit area on a layer of material and the necessity for having at least two levels of conductors separated by an insulating layer. These limitations have led to the recent development of a more attractive domain propagation arrangement in which domains are moved about under domain propagation channels which are defined by serrated grooves etched into the surface of a layer of suitable magnetic material. The distances between the edges or sides of the grooves vary in a repetitive serrative geometry characterized by the constraint that both sides of the groove are always equidistant from the longitiudinal axis of the groove.

Propagation of domains along the groove is achieved through a single, continuous, serpentine, propagation conductor which crisscrosses the groove in a looping pattern in a plane that is parallel to and insulated from the layer of material. Excitation of the propagation conductor with a train of pulses of alternating polarity generates consecutively offset magnetic fields along the longitudinal axis of the groove. These magnetic fields collectively cause serial patterns of domains located under either or both sides of the groove to move through a sequence of stable domain positions which are defined by the looping propagation conductor and the serrations on each side of the groove.

Ordinarily, the amplitude of the pulses which are applied to the propagation conductor is sufficiently small and the lateral dimensions of the propagation conductor pattern sufficiently large with respect to the dimensions of the groove and the domains so that domains merely propagate along from position to position under a particular side of the groove. However, by reducing the lateral dimension of the pattern defined by the propagation conductor by a sufficient amount at a selected position, a magnetically induced force tending to laterally displace a domain to the side of the groove with the reduced conductor pattern dimension is generated at the selected position each time the propagation conductor is excited with a pulse of suitable polarity and enhanced amplitude. This force is advantageously used to displace domains between corresponding positions on opposing sides of the groove. Plural ones of these positions, referred to in the art as enhanced propagation pulse, write circuits, are frequently defined by a single propagation conductor to provide for simultaneous displacement of plural domains across a groove. Examples of such an apparatus are shown and described in U. S. Pat. No. 3,711,840, issued Jan. 16, 1973 to J. A. Copeland III, and in U. S. Pat. No. 3,636,531, issued Jan. 18, 1972 to J. A. Copeland III.

Notwithstanding the recent innovations in the serrated groove technology which are reviewed above, there remains a pressing and unfulfilled need for a domain-pattern, sequence-inverting circuit, which is compatible with the basic serrated groove propagation apparatus. Recent studies looking into the feasibliity of implementing digital computer and time-slot interchanger systems with the serrated groove technology have indicated that a sequence inverting circuit, also known in the electronic arts as a "first-in, last-out" shift register, would be an important and perhaps indispensable element of such systems. Moreover, these studies have indicated that it is desirable that a sequence inverting circuit be developed which can be implemented as a serial link or element in a serrated groove domain propagation channel and have the capability of inverting the sequence of any serial pattern of domains which is propagated through the inverting circuit portion of the channel.

Accordingly, it is an object of this invention to provide a serial, domain pattern, inverting circuit which can be implemented as a serial element in a serrated groove domain propagation channel.

SUMMARY OF THE INVENTION

The invention lies in a circuit for controllably inverting the sequence of a serial pattern of single-wall magnetic domains. The circuit is implemented by offsetting or "phasing" the opposing serrations on the two sides of a serrated groove which defines a domain propagation channel so that the lateral distance between the sides of the groove remains constant over the length of the longitudinal axis of the groove. A serpentine propagation conductor defines enhanced propagation-pulse write circuits at each of the stable domain positions along both sides of the groove. A serial pattern of domains propagating in one direction along a side of the groove is, in response to the application to the propagation conductor of an enhanced propagation pulse, displaced to the opposite side of the groove where the pattern of domains propagates in the opposite direction, thereby inverting the sequence of the propagating pattern of domains.

DETAILED DESCRIPTION OF THE INVENTION

Figure 1:
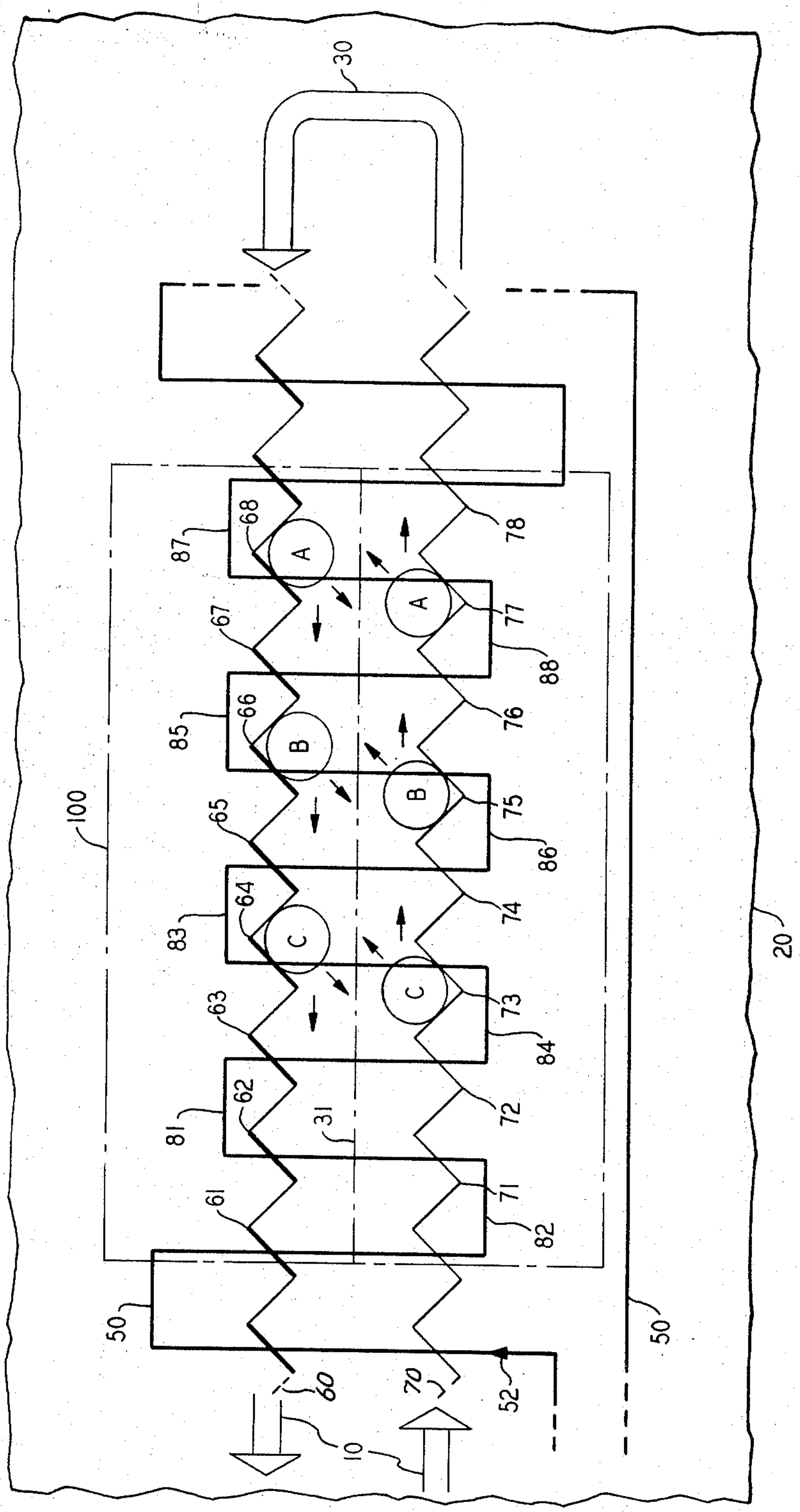
FIG. 1 illustrates a plan view of domain sequence inversion in a sequence inverting circuit implemented with serrated groove, single-wall magnetic domain technology.

A domain pattern, sequence inverting circuit 100 is depicted in FIG. 1 as a serial element in a domain propagation channel 10 that is configured on a layer 20 of suitable material in which single-wall magnetic domains are movable. For convenience of illustration, layer 20 is assumed to be magnetically biased positively in the direction which extends downwardly into the plane of FIG. 1. Domains propagating in layer 20 therefore possess opposing magnetic fields which extend upwardly from the plane of FIG. 1. Channel 10 may be any of a number of well-known types of channel arrangements for controllably propagating single-wall magnetic domains thereunder. Channel 10 is most advantageously, however, a serrated groove domain propagation arrangement in which a serial string of domains is propagated between stable positions along a single side of the groove under the influence of a train of pulses which are applied to a propagation conductor 50 that repeatedly crisscrosses the groove in a serpentine path. The presence of a domain at any of the alternating stable domain positions, which are defined by the individual serrations and the looping propagation conductor, represents, illustratively, a binary ONE, and the absence of a domain at the position represents a binary ZERO.

Thus, a bit of information is effectively represented in every other stable domain position of the positions along the groove. The reason for separating the information in this manner will become readily apparent in the subsequent description of the invention.

Sequence inverting circuit 100 comprises a serrated groove. Serial patterns of domains are propagated from channel 10 into the groove on lower side 70 of the groove. After propagating through lower side 70, domains are propagated through a looping domain propagation channel 30 to upper side 60. From upper side 60, domains are propagated back into channel 10. Serrations, conveniently referred to as stable domain positions, 61–68 and 71–78 on sides 60 and 70, respectively, of the groove are offset or "phased" with respect to one another so that the lateral distance between upper and lower sides 60 and 70 remains constant over the length of longitudinal axis 31 of the groove. This feature is to be contrasted with an ordinary serrated groove propagation channel in which the lateral distance between the sides of the groove varies over the length of the longitudinal axis of the groove, subject to the constraint that both sides of the groove are always equidistant from the longitudinal axis of the groove over the length of the axis.

The result of offsetting or phasing the serrations so that the distance between the sides of the groove remains constant over the length of longitudinal axis 31 is that domains propagate in opposite directions along upper and lower sides 60 and 70 in response to the application to conductor 50 of a train of normal propagation pulses of alternating polarity. Hence, a serial pattern of domains propagated from channel 10 into the groove on lower side 70 will, in response to a train of normal propagation pulses, merely continue to propagate on through channel 30 to upper side 60 and channel 10 without being inverted in sequence.

The lateral dimensions of the serpentine pattern defined by propagation conductor 50 within sequence inverting circuit 100 are made sufficiently small on lower and upper sides 70 and 60 to define enhanced propagation pulse write circuits 81, 83, 85, and 87 and 82, 84, 86, and 88 at the stable domain positions defined by serrations 62, 64, 66, and 68 and 71, 73, 75, and 77, respectively. As a result, domains located at any of positions defined by serrations 71, 73, 75, and 77 on lower side 70 are displaced to corresponding positions defined by serrations 62, 64, 66, and 68 on upper side 60 whenever the amplitude of a positive propagation pulse (the positive sense of which is defined by indicator 52 in FIG. 1) is suitably enhanced. Similarly, domains located at any of positions 62, 64, 66, and 68 on upper side 60 are displaced to corresponding positions among positions 71, 73, 75, and 77 on lower side 70 whenever the amplitude of a negative propagation pulse is appropriately enhanced.

The combination of structural features described above gives circuit 100 the capability to controllably invert the sequence of a serial pattern of domains which is propagated from channel 10 into lower side 70 of the groove. For instance, assume that a serial string of domains A, B, and C is sequentially propagated in the order A, B, C from channel 10 into alternate positions 75, 73, and 71, respectively. Application of propagation pulses 1 and 2, plotted as a function of time in FIG. 2, to propagation conductor 50 results in the movement of domains A, B, and C toward channel 30 to positions 77, 75, and 73, respectively. Continued application to conductor 50 of ordinary alternating positive and negative propagation pulses, such as pulses 1 and 2, would result in domains A, B, and C merely propagating through channel 30 to the positions on upper side 60. Eventually, the domains would be shifted from upper side 60 back into channel 10 in the same sequence in which they entered — A, B, C.

Figure 2:
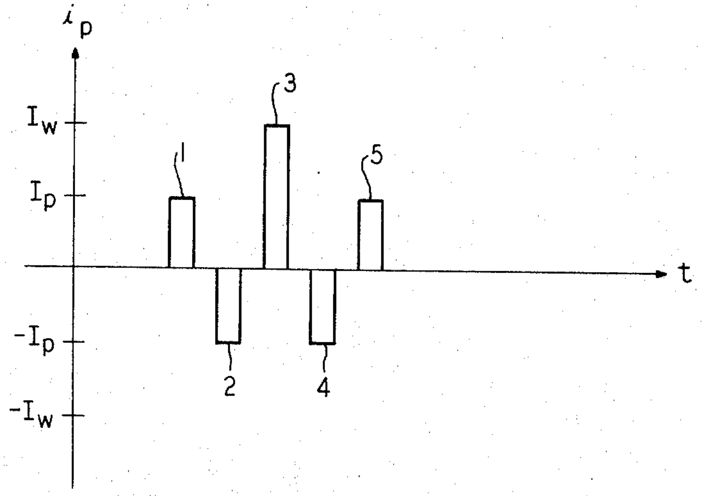
FIG. 2 depicts a plot of the propagation pulse train required to achieve the domain sequence inversion shown in FIG. 1.

Enhancement, however, of the amplitude of pulse 3 from a normal positive amplitude $I_p$ to a larger positive amplitude $I_w$, as shown in FIG. 2, while domains A, B, and C are located at positions 77, 75, and 73, respectively, causes domains A, B, and C to be displaced across the groove to positions 68, 66, and 64, respectively.

Since domains can be displaced from lower side 70 to upper side 60 only while the domains occupy the alternate "odd" positions 71, 73, 75, and 77, it should now be apparent to one skilled in the art why each bit of information represented by the serial pattern of domains need be spaced by a distance amounting to one serration or stable domain position while in the lower side of the groove.

Once displaced from lower side 70 to upper side 60, the domains, in response to a train of normal propagation pulses, illustrated in FIG. 2 by pulses 4 and 5, propagate in the sequence C, B, A toward channel 10. Continued application to conductor 50 of normal propagation pulses of amplitude $I_p$ results in domains A, B, and C, reentering channel 10 from upper side 60 in the sequence C, B, A, which is inverted with respect to the sequence A, B, C in which the domains entered circuit 100.

An additional feature of sequence inverting circuit 100 is that the sequence of a serial pattern of domains propagating along upper side 60 of the groove can also be inverted by suitably enhancing the amplitude of a propagation pulse of negative polarity. For example, assume that domains C, B, and A are momentarily located at positions 64, 66, and 68, respectively, while propagating along upper side 60 toward channel 10. Enhancement of the amplitude of a negative propagation pulse from-$I_p$ to-$I_w$ causes domains C, B, and A to be displaced across the groove to positions 73, 75, and 77, respectively. Subsequent application to propagation conductor 50 of a train of propagation pulses of alternating polarity and amplitude $I_p$ results in the domains propagating in the sequence A, B, C, on lower side 70 toward channel 30. Eventually, the domains would reenter channel 10 from upper side 60 in the sequence A, B, C.

Sequence inverting circuit 100 has been described above and illustrated in FIG. 1 in an embodiment featuring but four lower enhanced pulse write circuits 82, 84, 86, and 88, four upper enhanced pulse write circuits 81, 83, 85, and 87, and eight opposing pairs of stable domain positions (defined by serrations 61–68 and 71–78). As a result, the circuit is only capable of inverting the sequence of serial patterns of domains comprising up to four domains. The circuit can, however, be readily expanded to handle larger patterns of domains by correspondingly expanding the number of stable domain positions and enhanced propagation pulse write circuits comprising the inverting circuit. For instance, the embodiment of the inverting circuit schematically shown in FIG. 1 can be expanded to invert the sequence of a serial pattern of domains containing up to eight domains by doubling the number of opposing pairs of stable domain positions and enhanced propagation pulse write circuits now comprising the inverting circuit.

Figure 3:
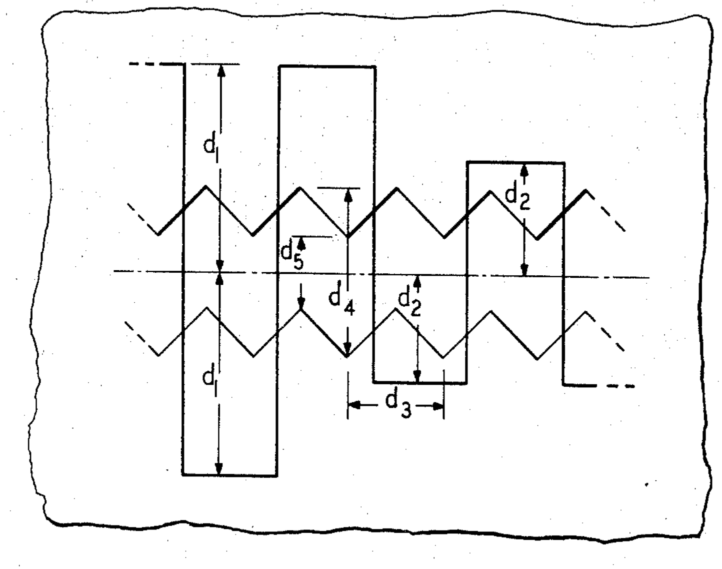
FIG. 3 shows a number of important physical dimensions of an operating embodiment of a sequence inverting cicuit.

In practice a working embodiment of the sequence inverting circuit has been constructed and operated using an epitaxial layer of a suitable garnet material having a thickness of 5.4 $\mu$m. The numerical values of the physical dimensions of the groove, which are pointed out in FIG. 3, are: $d_1 = 25\ \mu m$; $d_2 = 14\ \mu m$; $d_3 = 20\ \mu m$; $d_4 = 28\ \mu m$; $d_5 = 20\ \mu m$; and the depth of the groove in the epitaxial layer is 1.0 $\mu$m. A normal propagation pulse amplitude of 4 ma and an enhanced propagation pulse amplitude of 10 ma has been found to provide satisfactory circuit operation when the magnetic bias field is adjusted to yield domains having a diameter of 10 $\mu$m.

Although the present invention has been described in accordance with particular applications and embodiments thereof, it is intended that all additional modifications, applications, and embodiments which will be apparent to those skilled in the art in light of the teachings of the invention be included within the spirit and scope of the invention.

What is claimed is:

1. An improved domain propagation channel arrangement including a layer of material in which single-wall magnetic domains are movable, a groove in said layer having serrated edges, and a propagation conductor which crosses said groove a plurality of times in a serpentine path, wherein the improvement comprises:

the serrated edges of said groove are configured in such a manner that the lateral distance between the edges in a direction perpendicular to the longitudinal axis of said groove is constant over the length of said groove so that domains propagate in opposite directons along the edges of said groove in response to the application of a train of propagation pulses of alternating polarity to said propagation conductor.

2. In combination:

a layer of material in which single-wall magnetic domains are movable;

a groove in said layer having first and second serrated edges, the distance between said first and second edges in a direction perpendicular to the longitudinal axis of the groove being constant over the length of the longitudinal axis of said groove;

conductive means for defining a first sequence of stable domain positions along said first edge of said groove and a second sequence of stable positions along said second edge of said groove, such that a serial pattern of domains propagates in a first direction along said first sequence of stable positions and a serial pattern of domains propagates in a second direction along said second sequence of stable positions in response to the application to said conductive means of a first pulse of a first predetermined amplitude, and a serial pattern of domains propagating in said first direction along said first sequence of stable positions is displaced to said second sequence of positions in response to the application to said conductive means of a second pulse of a second predetermined amplitude greater than said first amplitude, thereby reversing the direction of propagation and inverting the sequence of said pattern of domains.

3. The combination in accordance with claim 2 in which said conductive means crosses said groove plural times in a serpentine path which extends a predetermined lateral distance from the longitudinal axis of said groove.

4. The combination in accordance with claim 3 in which the lateral distance which the pattern defined by said conductive means extends from the longitudinal axis of said groove is sufficiently large to preclude lateral displacement of domains across said groove in response to one of said first pulses; and the lateral distance which the pattern defined by said conductive means extends from the longitudinal axis of said groove is sufficiently small to result in the lateral displacement of domains across said groove in response to one of said second pulses.

5. The combination in accordance with claim 4 in which domains are displaced from said first edge to said second edge of said groove in response to a second pulse of a first polarity and are displaced from said second edge to said first edge in response to a second pulse of a second polarity.

6. The domain propagation channel arrangement in accordance with claim 1 in which the lateral distance between the edges of said groove is sufficiently large to allow the oppositely propagating patterns of domains to pass one another.

* * * * *